Sept. 20, 1971     C. A. GENTHER     3,606,098
CONDITIONING LIQUID DISPENSER FOR A CONVEYOR
Filed July 11, 1969
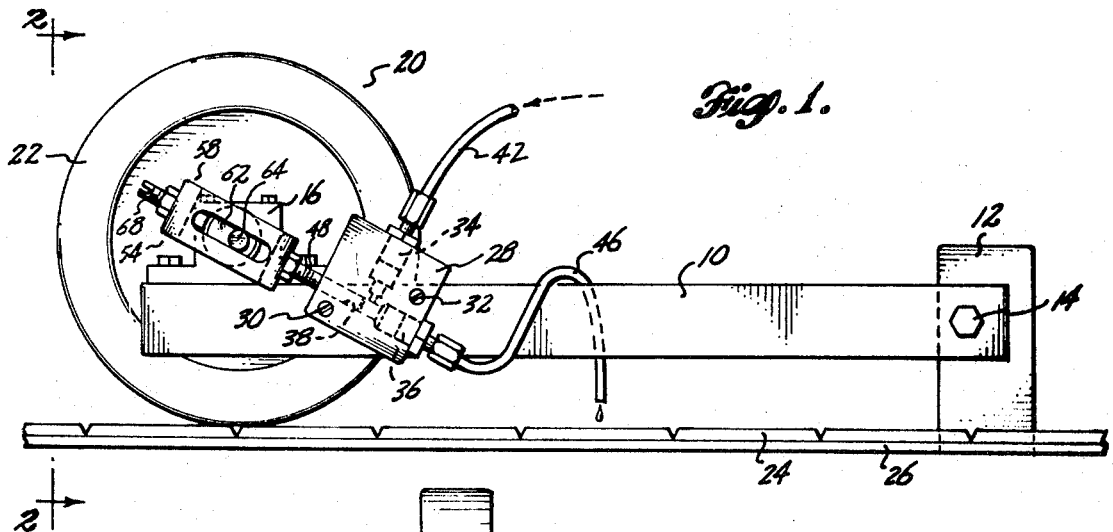
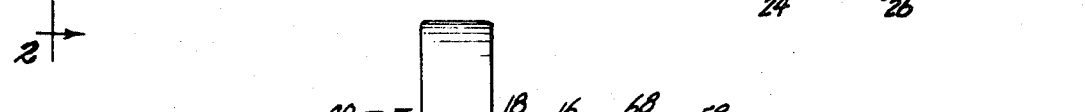
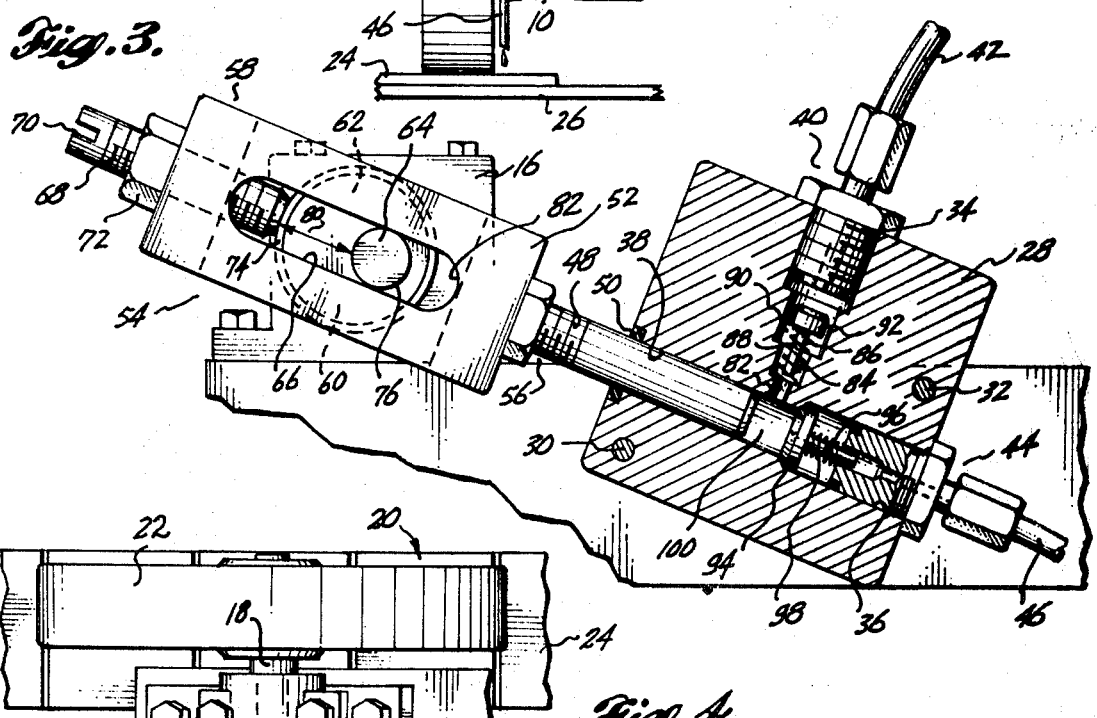
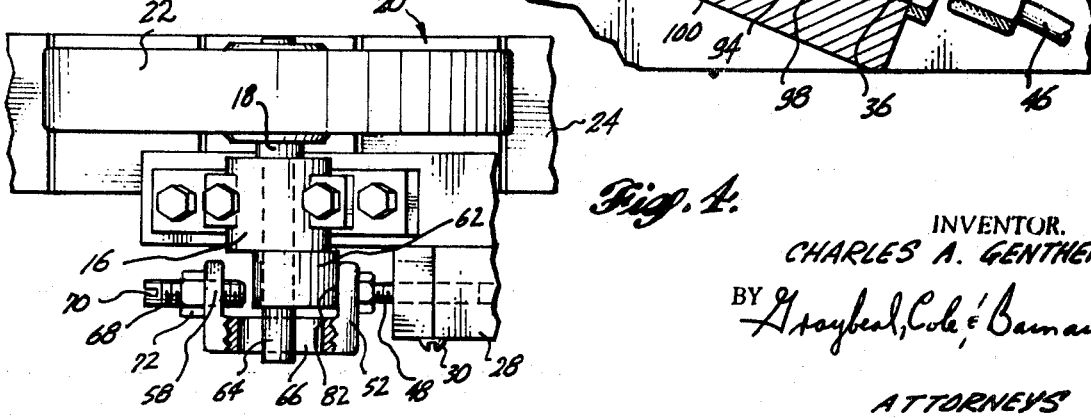
INVENTOR.
CHARLES A. GENTHER
BY Graybeal, Cole & Barnard
ATTORNEYS

United States Patent Office 3,606,098
Patented Sept. 20, 1971

3,606,098
CONDITIONING LIQUID DISPENSER FOR A CONVEYOR
Charles A. Genther, 8180 Merrimount Drive,
Mercer Island, Wash. 98040
Filed July 11, 1969, Ser. No. 840,969
Int. Cl. G01f 11/06
U.S. Cl. 222—309
10 Claims

ABSTRACT OF THE DISCLOSURE

A reciprocating piston type metering device is secured to a support arm. A large diameter drive wheel is connected to one end of the axle; a small diameter cam wheel is connected to the opposite end of the axle; a bearing rotatably supports the axle on the support arm. The support arm is pivotally connected to a frame portion of a conveyor at a location placing the drive wheel in contact with a traveling runner of the conveyor. An eccentrically mounted pin extends axially from the cam wheel into an elongated guide slot formed in the side wall of a yoke connected to the piston. The cam wheel is between two end walls of the yoke which are spaced radially outwardly from the periphery of the cam wheel. An adjustable stop (e.g. a bolt) is threadably received in the end wall of the yoke distal the piston. A first conduit delivers conditioning liquid to the inlet of the metering device, and a second conduit leads from the outlet of the metering device to a discharge position above the conveyor runner.

BACKGROUND OF THE INVENTION

Field of the invention

This invention relates to a mechanism for delivering a conditioning liquid (e.g. a lubricant-cleaner) to a flat conveyor runner, such as is found in the type of conveyor used in bottling plants, for example. More particularly, it relates to a metering device which is driven by the motion of the conveyor runner and thus is in operation only during those periods of conveyor use.

Description of the prior art

Conveyors such as used in milk or soft drink bottling plants, for example, must be continuously cleaned and lubricated. It is customary in these plants to deliver a liquid which is both a cleaner and a lubricant through a conduit to the moving parts of the conveyor. The liquid is then either sprayed on the moving runner of the conveyor or allowed to drip slowly out of the conduit onto the runner. The delivery conduit usually includes a hand operated valve which must be opened by an operator when the conveyor is turned on and then turned off by the operator when the conveyor is turned off. A disadvantage of this type of system is that the operator oftentimes forgets or neglects to open the valve initially, resulting in the conveyor being operated for a period of time without proper cleaning and lubrication, or forgets to close the valve when the conveyor is shut down, resulting in the liquid continuing to flow. As will be appreciated, this latter type happening results in a waste of the liquid and more often than not also results in the creation of a mess in the form of a large puddle of the liquid on the floor of the plant which somebody must take time to clean up. Even when the operator remembers to properly control the valve, his so doing amounts to an extra operation and takes time which he could otherwise use for other purposes.

What is needed is a dispenser device for the lubricant-cleaner liquid which automatically controls the supply of the liquid to the conveyor only during those periods of conveyor operation. The device should be simple in construction, be easy to maintain and to clean, be durable and capable of a long life of repetitious use, and be inexpensive to manufacture so that it can be sold to the user at a reasonable price.

SUMMARY OF THE INVENTION

This invention relates to the provision of a dispenser mechanism for conveyor conditioning liquids which meets the criteria stated in the last paragraph of the immediately preceding section of this document.

Generally speaking, the dispenser of this invention comprises a reciprocating piston type metering device (e.g. a positive displacement pump) secured to a support arm. A bearing at one end of the arm rotatably supports an axle. A large diameter drive wheel is connected to one end of the axle on one side of the support arm and a small diameter cam wheel is connected to the opposite end of the axle on the opposite side of the support arm. The support arm is pivotally connected to a frame portion of a conveyor at a location placing the periphery of the drive wheel in contact with the traveling runner of the conveyor. A yoke is connected to the outer end of the piston. It includes a side wall which extends contiguous a side face of the cam wheel and two opposed end walls which are spaced radially outwardly from the periphery of the cam wheel. An eccentrically mounted pin extends axially from the cam wheel into an elongated guide slot formed in the side wall of the yoke. An adjustable stop in the form of an externally threaded cylinder is threadably received in an internally threaded bore formed in the end wall of the yoke distal the piston. A supply conduit delivers the conditioning liquid to the inlet of the metering device. A short discharge conduit leads from the outlet of the metering device over to a discharge position above the conveyor runner.

BRIEF DESCRIPTION OF THE DRAWING

FIG. 1 is a side elevational view of the conditioning fluid dispenser of the present invention, with the drive wheel thereof shown resting on a traveling conveyor runner;

FIG. 2 is an end elevational view of the dispenser, taken from the aspect of line 2—2 of FIG. 1;

FIG. 3 is an enlarged fragmentary view of the pump and adjustable drive cam mechanisms; and FIG. 4 is a fragmentary top plan view of the drive wheel and adjustable drive assembly, with an upper bar portion of the yoke being cut away for clarity of illustration.

DESCRIPTION OF THE PREFERRED EMBODIMENTS

In FIG. 1 the mechanism is shown to comprise a support arm 10 pivotally connected at one end to a fixed support 14 for vertical pivotal movement about a horizontal axis. As best shown by FIG. 2, the support arm 10 may be a section of channel stock.

A pillow block or bearing 16 is bolted or otherwise secured to the upper surface of the arm 10 at the end thereof opposite the pivot pin 14. The pillow block 16 serves to rotatably support the axle 18 of a drive wheel 20. Preferably, the drive wheel 20 includes an annular tire portion 22 constructed from rubber or the like.

The wheel 22 is shown to rest on a traveling runner 24 of a conveyor. The runner 24 is shown to be supported on a horizontal track 26.

A block or housing 28 is secured to the support arm 10, such as by a pair of bolts 30, 32, for example. The block 28 is shown to include an inlet 34 and an outlet 36 set at right angles to the inlet 34. A piston bore 38 is formed in block 28 axially endwise of the outlet 36. By way of typical and therefore nonlimitative example, the block 28 may be constructed from a suitable hard plastic material, with the inlet, outlet and piston chambers all being bores formed in the block 28, in the positions and in the manner illustrated.

The inlet 34 is shown to be internally threaded and to be in receipt of one end of an inlet fitting 40. The opposite end of the inlet fitting 40 is attached to a conduit 42 leading from a source of conditioning fluid, e.g. a combination detergent-lubricant liquid.

Similarly, the outlet bore 36 is internally threaded and shown to be in receipt of the threaded end of an outlet fitting 44. The outlet fitting 44 serves to attach the receiving end of a dispenser conduit 46 to the outlet of the block 28. As shown by FIG. 1, the outlet conduit 46 extends downwardly to a discharge position over the conveyor runner 24.

Referring in particular to FIG. 3, a piston 48 is shown received in the piston bore 38 of block 28. A suitable packing or seal 50 may be provided around the piston 48 where it emerges from bore 38. The outer end of piston 48 is secured to an inner end wall 52 of a yoke block 54, such as by a threaded connection 56, for example. In addition to the inner end wall 52 the yoke block 54 includes an outer wall 58 and an interconnecting side wall 60. The end walls 52, 58 are parallel to each other. A cam wheel chamber is formed axially between the end walls 52, 58 and laterally inwardly of the side wall 60. A cam wheel 62 is eccentrically mounted on the end portion of axle 18 which extends outwardly from the pillow block 16 on the opposite side thereof from the drive wheel 20. An end portion 64 of the cam wheel 62 extends axially from the cam wheel into an elongated slot 66 formed in the side wall 60 of yoke block 54. The slot 60 is generally colinear with both the piston 48 and an adjustable stop bolt 68. The stop bolt 68 is externally threaded and is threadedly engaged within an internally threaded bore formed in the end wall 58 of block 54. Such bore is generally coaxial with the piston 48, as shown by FIGS. 3 and 4 when viewed in combination. The outer end of adjustment bolt 68 may be slotted, such as at 70, to receive a screwdriver, and preferably the bolt 68 is provided with a lock nut 72.

The axle extension 64 and the elongated slot 66 serve as guides between the yoke block 54 and the cam wheel 62. The wheel 62 includes an annular rim portion 74 and a cylindrical hub portion 76. The rim portion 74 is mounted for free rotation about the hub portion 76.

As can be seen from viewing FIG. 3, as the wheel 62 rotates the axle extension 64 travels back-and-forth in the slot 66. During those periods when the annular rim 74 neither contacts the inner end of bolt 68 nor the inner surface 82 of end wall 52, the rim 74 and the inner body 76 of wheel 62 rotate together. However, when the larger radius portion 80 of the wheel 62 contacts either the inner end of screw 68 or the inner surface 82 of end portion 52, the hub portion 76 of the wheel 62 is free to rotate within the annular rim 74, in the event there is frictional engagement between the rim 74 and the particular surface it is pressing against. When the larger radius portion 80 of wheel 62 moves against surface 82 it pushes the piston 48 axially inwardly within the bore 38. Then, once such larger radius portion 80 of the wheel 62 rotates around and contacts the inner end of adjustment bolt 68 it serves to displace the bolt 68, the yoke 54 and the piston 48, as an assembly, axially outwardly with respect to the bore 38. Rotational movement of the adjustment bolt 68 in-and-out serves to adjust the stroke of the piston 48. From viewing FIG. 3 it is apparent that if the bolt 68 were to be screwed inwardly an additional amount from the position shown, the wheel 62 would make contact with the inner end of bolt 68 sooner and would displace the yoke 54, and hence the piston 48, further to the left.

The piston and block assembly 48, 28 may merely be a valving arrangement, with the pressure of the liquid in conduit 42 being used to move the fluid throughout the passageways in block 28 whenever the ports are opened by suitable positioning of the piston 48, or the piston-block assembly 48, 28 may be a positive displacement pump, as is illustrated.

In FIG. 3 the inlet bore is shown to consist of several portions. The innermost portion 82 is a metering orifice. Immediately outwardly of orifice 82 is a slightly larger diameter portion 84 of the bore in which is positioned a compression spring 86. Spring 86 receives a guide stem 88 of an inlet valve 90 in the open interior of the spring 86. The head portion 90 of the valve member is slidably received in a yet larger diameter portion 92 of the inlet bore.

The outlet bore contains an outlet valve including a large diameter head portion 94, including a guide stem 96. The guide stem 96 is received within the open center passageway of a compression spring 98. The compression spring 98 is seated within a small diameter bore formed in the inner end portion of the outlet fitting 44.

In operation, the linear travel of the conveyor runner 24 exerts a frictional force on wheel 20. This causes wheel 20 to turn and as it turns it rotates with it the cam wheel 62. As wheel 62 rotates its larger radius portion 80 makes alternating contact with the inner end surface of the adjustable stop 68 and the inner surface 82 of end wall 52 of yoke member 54, causing back-and-forth longitudinal travel of the yoke and the piston 48 to which it is connected. As will be apparent, as the piston 48 moves outwardly, the pressure below valve member 90 is relieved, such member 90 moves inwardly, allowing fluid from line 42 to flow into the chamber 100. Then when the piston 48 changes direction it exerts a pressure on the liquid in chamber 100. This causes an outward sealing pressure on valve member 90 and an opening pressure on valve member 94, resulting in a positive displacement of the liquid out from chamber 100, through the outlet fitting 44, and into the conduit 48.

Thus, it can be seen that the length of the piston stroke, which may be adjusted by a rotation of the adjustable stop 68, and the speed of travel of the conveyor runner 24, cooperate to provide a dispenser mechanism which dispenses only a measured amount of the conditioning liquid, and only does such during the periods of conveyor operation. In other words, the dispenser is responsive to conveyor operation. When the runner 24 is not traveling, the wheel 20 is not rotating, and hence the piston drive mechanism is not functioning. During these periods the valve members 90, 94 function to prevent movement of the conditioning liquid from the conduit 42 to and through the conduit 46 onto conveyor runner 42.

What is claimed is:

1. A mechanism for dispensing measured amounts of a conditioning liquid onto a moving conveyor runner, comprising:

a drive wheel;

mounting means for mounting said drive wheel in a set position relative to a movable conveyor runner with its periphery in contact with the conveyor runner, so that as the conveyor runner moves it rotates the drive wheel;

metering means drivingly connected to said drive wheel, to be driven thereby, for dispensing a metered amount of conditioning liquid in response to drive wheel rotation, said means including an inlet and an outlet;

conduit means for delivering a conditioning liquid to said inlet; and conduit means leading from said outlet to a discharge position adjacent the conveyor runner, for discharging the dispensed conditioning liquid onto said conveyor runner.

2. The mechanism of claim 1, wherein the mounting means for the drive wheel comprises an elongated support arm having pivot pin means near one end thereof for pivotally mounting such end to a fixed support adjacent of the conveyor, with the drive wheel being mounted on the arm at a location spaced from the pivot pin.

3. The mechanism of claim 2, wherein the metering means comprises a body connected to the support arm so as to be carried thereby, with the inlet and the outlet being ports respectively leading into and out from said body.

4. The mechanism of claim 3, wherein said body comprises a piston chamber, an inlet passageway leading from the inlet into the piston chamber, an outlet passageway leading from the piston chamber to said outlet, control means including a piston slidably received in the piston chamber, and transmission means drivingly interconnected between the drive wheel and the piston, operable to cause said piston to reciprocate in the piston chamber in response to rotation of the drive wheel.

5. The mechanism of claim 4, wherein the transmission means is a Scottish yoke drive including a cam wheel at one end of an axle, and a yoke block connected to the piston and including spaced apart stop surfaces between which the cam wheel rotates with the drive wheel being connected to the opposite end of the axle.

6. The mechanism of claim 5, wherein one of the stop surfaces is adjustable towards and away from the other surface, so that the distance between the two stop surfaces can be varied.

7. The mechanism of claim 1, wherein said metering means includes a reciprocating piston, the drive wheel includes an axle, a cam wheel is eccentrically mounted on the axle opposite the drive wheel, a yoke block is connected to said piston, and said block includes a pair of spaced apart end walls and an interconnecting side wall, with the inner surface of the side wall being closely adjacent the end surface of the cam wheel opposite the drive wheel, and with the cam wheel turning in the space between the two end walls of the yoke block, said side wall including an elongated slot which is parallel to the piston, and with the axle extending through the cam wheel and then axially beyond into the elongated slot.

8. The mechanism of claim 7, wherein a threaded bore extends through one of the end walls and has an axle which is colinear to both the elongated slot and the piston, and an adjustable stop member in the form of an externally threaded cylinder is threadably received in said bore and includes an inner stop surface movable towards and away from the periphery of the cam wheel.

9. The mechanism of claim 8, wherein the mounting means for the drive wheel comprises an elongated support arm, and a bearing is located on the arm and has a rotational axis which extends laterally of the arm, said bearing surroundingly engaging the axle between the drive wheel and the cam wheel.

10. The mechanism of claim 9, wherein said metering means includes a body member secured to the support arm, with the inlet and the outlet leading into and out from said body member.

References Cited
UNITED STATES PATENTS

| | | | |
|---|---|---|---|
| 2,394,781 | 2/1946 | Jeffords | 222—177 |
| 3,503,470 | 4/1970 | Lister | 184—15X |

ROBERT B. REEVES, Primary Examiner

J. P. SHANNON, JR., Assistant Examiner

U.S. Cl. X.R.

184—15A